(12) United States Patent
Bellovin et al.

(10) Patent No.: US 6,665,299 B1
(45) Date of Patent: Dec. 16, 2003

(54) METHOD AND SYSTEM FOR TELEPHONY AND HIGH SPEED DATA ACCESS ON A BROADBAND ACCESS NETWORK

(75) Inventors: Steven Michael Bellovin, Westfield, NJ (US); Joseph Henry Condon, Summit, NJ (US); Richard Vandervoort Cox, New Providence, NJ (US); Alexander Gibson Fraser, Bernardsville, NJ (US); Charles Robert Kalmanek, Jr., Short Hills, NJ (US); Alan Edward Kaplan, Morris Township, Morris County, NJ (US); Thomas Joseph Killian, Westfield, NJ (US); William Todd Marshall, Chatham, NJ (US); Peter Z. Onufryk, Flanders, NJ (US); Kadangode K. Ramakrishnan, Berkeley Heights, NJ (US); Norman Loren Schryer, New Providence, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/231,681

(22) Filed: Jan. 14, 1999

Related U.S. Application Data

(60) Provisional application No. 60/071,346, filed on Jan. 14, 1998.

(51) Int. Cl.$^7$ .............................................. H04L 12/28
(52) U.S. Cl. ...................... 370/395.2; 379/14; 379/230
(58) Field of Search ......................... 370/395.53, 395.2, 370/352, 410, 470, 498, 522, 351; 348/14, 16, 17; 379/219, 221, 229

(56) References Cited

U.S. PATENT DOCUMENTS

| | | | | |
|---|---|---|---|---|
| 5,187,706 A | * | 2/1993 | Frankel | 370/16.1 |
| 5,343,240 A | * | 8/1994 | Yu | 348/14.01 |
| 5,668,857 A | * | 9/1997 | McHale | 379/93.07 |
| RE36,707 E | * | 5/2000 | Papanicolau | 379/230 |
| 6,075,784 A | * | 6/2000 | Frankel | 370/356 |
| 6,075,787 A | * | 6/2000 | Bobeck | 370/395.2 |
| 6,236,653 B1 | * | 5/2001 | Dalton | 370/352 |
| 6,282,189 B1 | * | 8/2001 | Eames | 370/352 |
| 6,396,531 B1 | * | 5/2002 | Gerszberg | 348/14.01 |
| 6,477,595 B1 | * | 11/2002 | Cohen | 710/105 |
| 6,563,816 B1 | * | 5/2003 | Nodoushani | 370/352 |

* cited by examiner

*Primary Examiner*—Douglas Olms
*Assistant Examiner*—Ricardo M. Pizarro

(57) ABSTRACT

A system and method for providing telephony and high speed data access over a broadband access network, comprising a network interface unit (NIU) coupled to a backup local exchange carrier (LEC) line, the broadband access network coupled to the NIU, an intermediate point-of-presence (IPOP) coupled to the broadband access network, and at least one external access network coupled to the IPOP. The system also provides for a fail-safe mode in which the NIU supports the LEC line for lifeline services.

4 Claims, 2 Drawing Sheets

METHOD AND SYSTEM FOR TELEPHONY AND HIGH SPEED DATA ACCESS ON A BROADBAND ACCESS NETWORK

PRIORITY CLAIM

We hereby claim the benefit under 35 U.S.C. §119(e) of U.S. Provisional Application No. 60/071,346 filed Jan. 14, 1998, entitled "Telephony On A Broadband Network."

FIELD OF THE INVENTION

This invention relates to the field of broadband access networks, and more specifically to a method and system for telephony and high speed data access on a broadband access network.

BACKGROUND OF THE INVENTION

Broadband access networks may provide a viable alternative to present local exchange carrier (LEC) loops in providing voice and data transmissions. Although a number of innovations have occurred concerning high speed cable modems and radio frequency (RF) telephony equipment, these innovations do not support both data and telephony well. Furthermore, present broadband access networks such as cable systems are susceptible to network failures and power outages. During, for example, a power outage, transmission over the cable system is not possible. LEC loops have very limited bandwidths; however, the LEC loops have separate power sources and operate even during power outages providing for emergency calls or other lifeline services.

What is needed is an invention that supports data and telephony access over broadband access networks while still providing, at least, basic telephony service during power outages.

SUMMERY OF THE INVENTION

The present invention provides for a system for providing telephony and high speed data access over a broadband access network. The system includes a network interface unit (NIU) coupled to a telephone line, the NIU coupled also to the broadband access network, the broadband access network coupled to an intermediate point-of-presence (IPOP), and the IPOP coupled to at least one external access network.

The present invention also provides for a network interface unit (NIU) of a system for providing telephony and high speed data access on a cable network. The system includes a broadband telephone interface (BTI) coupled to a backup local exchange carrier (LEC) line, and a cable modem coupled to the BTI. The cable modem is coupled to the cable network.

The present invention also provides for an office in a system for providing telephony and high speed data access on a cable network. The office includes a network interface unit (NIU) having a broadband telephone interface (BTI) and a cable modem. The office also includes a telephone line coupled to the BTI and a cable coupled to the cable modem.

The present invention provides for a network interface unit (NIU) in a system for providing telephony and high speed data access on a cable network. The NIU includes a cable modem and a means for accessing a telephone line during a power outage.

The present invention provides for an intermediate point-of-presence (IPOP) in a system for providing telephony and high speed data access on a broadband access network. The IPOP includes means for separating voice and data traffic, means for switching to an external access network, and means for routing to the external access network. The separating means is coupled to the switching means and the routing means is coupled to the switching means.

The present invention further provides for an intermediate point-of-presence (IPOP) in a system for providing telephony and high speed data access on a broadband access network. The IPOP includes an access network termination system (ANTS), a switch coupled to the ANTS, and at least one number translation database coupled to the switch.

The present invention provides for a method for providing telephony and high speed data access on a broadband access network. The method includes the steps of providing a network interface unit (NIU), coupling a telephone line and the broadband access network to the NIU, using the NIU to provide telephony and high speed data access on the broadband access network, and using the NIU to support the telephone line during power outages.

The present invention provides for a method for providing a network interface unit (NIU) in a system for providing telephony and high speed data access on a cable network. The method includes the steps of supporting a backup, local exchange carrier (LEC) line with a broadband telephone interface (BTI), using the backup LEC line during a failure of the cable network, and accessing telephony and high speed data through a cable modem coupled to the cable network.

The present invention provides for a method for providing lifeline services during a power outage in a system for providing telephony and high speed data access on a broadband access network. The method includes the steps of connecting a backup local exchange carrier (LEC) line to the system and accessing the backup LEC line.

DETAILED DESCRIPTION

Figure 1:
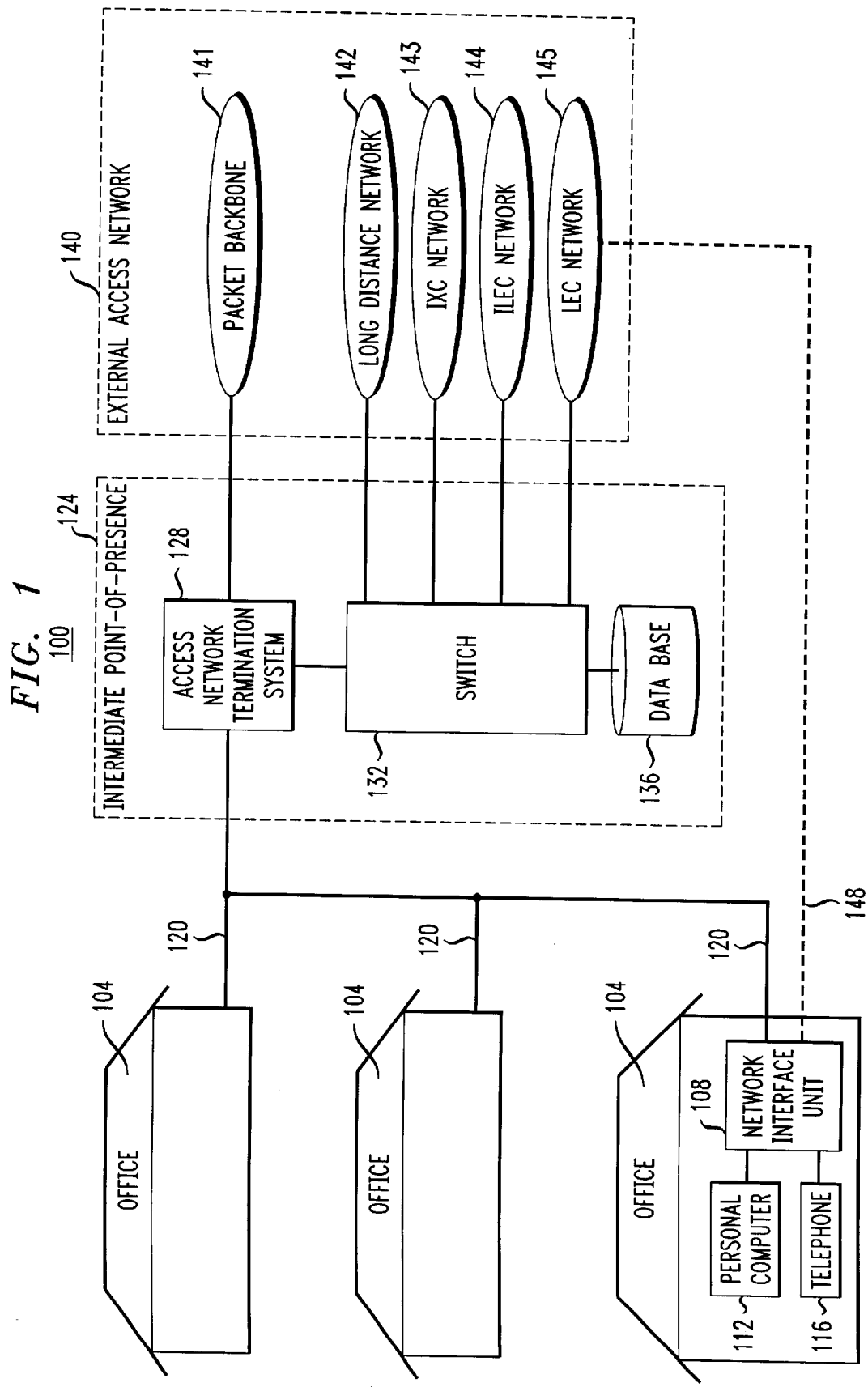
FIG. 1 illustrates a system which provides telephony and high speed data access on a broadband access network.

FIG. 1 illustrates a system which provides telephony and high speed data access on a broadband access network in accordance with a preferred embodiment of the present invention. The system 100 comprises offices 104, network interface units (NIUs) 108, personal computers 112, telephones 116, a broadband access network 120, an intermediate point-of-presence (IPOP) 124, an access network termination system (ANTS) 128, a switch 132, at least one number translation database 136, at least one external access network 140 and a local exchange carrier (LEC) line 148.

Each office 104 comprises the NIU 108, the personal computer 112 and the telephone 116. The personal computer 112 is coupled to the NIU 108, the coupling being preferably through a local area network (LAN) such as, for example, an ethernet. As such, there may be a plurality of personal computers 112 coupled to the NIU. The telephone 116 is also coupled to the NIU. There may be more than one telephone 116 within the office 104 coupled to the NIU either directly or indirectly. Furthermore, the telephone 116 may include any variety of office equipment such as fax machines, voice grade modems, hand sets and internal housing wiring.

Each office 104 is coupled to the broadband access network 120 through its NIU 108. The broadband access network 120 is coupled to the IPOP 124. The broadband access network 120 in the system 100 is intended to accommodate a range of transport technologies such as, but not limited to, hybrid-fiber coaxial cable, mini-fiber node and wireless technologies.

The IPOP 124 comprises the ANTS 128, the switch 132 and the at least one number translation database 136. The ANTS 128 is coupled to the switch 132 which, in turn, is coupled to the at least one number translation database 136. The ANTS 128 is coupled to the broadband access network 120. In a preferred embodiment, the at least one external access network 140 is coupled either to the ANTS 128 and/or to the switch 132. In a preferred embodiment, the at least one external access network 140 comprises a packet backbone 141 coupled to the ANTS 128. In another preferred embodiment, the at least one external access network 140 comprises an asynchronous transfer mode (ATM) backbone (not shown) coupled to the ANTS 128. In another preferred embodiment, the at least one external access network 140 comprises a long distance carrier network 142 coupled to the switch 132. In another preferred embodiment, the at least one external access network 140 comprises an LEC network 145 coupled to the switch 132. In another preferred embodiment, the at least one external access network 140 comprises an incumbent local exchange carrier (ILEC) network 144 coupled to the switch 132. In another preferred embodiment, the at least one external access network 140 comprises an inter-exchange carrier (IXC) network 143 coupled to the switch 132. In another preferred embodiment, the at least one external access network 140 comprises the ATM backbone (not shown) coupled to the switch 132. The present invention contemplates any permutations and combinations of the above possible external access networks 140 and possible couplings to the IPOP 124.

In a preferred embodiment, the LEC line 148 couples the NIU 108 and the LEC network 145.

The general use and operation of the system 100 will now be described with reference to FIG. 1. A user accesses the broadband access network 120 by using existing personal computers 112 or telephones 116 in the office 104. The voice and/or high speed data traffic transferred or received by these devices 112 and 116 passes through the NIU 108. The NIU 108 terminates the data-link layer protocol from the broadband access network 120 and provides services for voice, high speed data and any combination thereof. High speed data and telephony services share allocated bandwidth in the downstream direction as well as in the frequency agile upstream channel.

A remote data-link layer termination is performed at the IPOP 124 by the ANTS 128. Voice and high speed data traffic flowing to and from the offices 104 pass through the ANTS 128. Upstream voice and high speed data traffic are separated or groomed by the ANTS 128, if necessary, before being forwarded onwards. In a preferred embodiment, upstream voice traffic may be processed within the ANTS 128 which connects the voice to a circuit switched public switched telephone network (PSTN). Upstream data may be processed within the ANTS 128 before being handed to a router. In another preferred embodiment, upstream voice traffic is separated and routed to, for example, the packet backbone 141. Voice traffic is separated and routed to, for example, the local exchange switch 132. In another preferred embodiment, the ANTS 128 interfaces to the local switch 132 like a conventional subscriber loop carrier (SLC) system.

The system 100 acts as an LEC, providing voice service over the broadband access network 120. Calls originating from office 104 may be routed to the long distance network 142, the IXC network 143, the ILEC network 144 or the LEC network 145. Incoming long distance calls are routed to the LEC that serves the local number using the local number portability database. Several number translation databases 136 are typically needed in order to manage call routing.

If communication to the IPOP 124 over the broadband access network 120 is not possible, lifeline services are provided through an LEC line 148 connected to the NIU 108.

Figure 2:
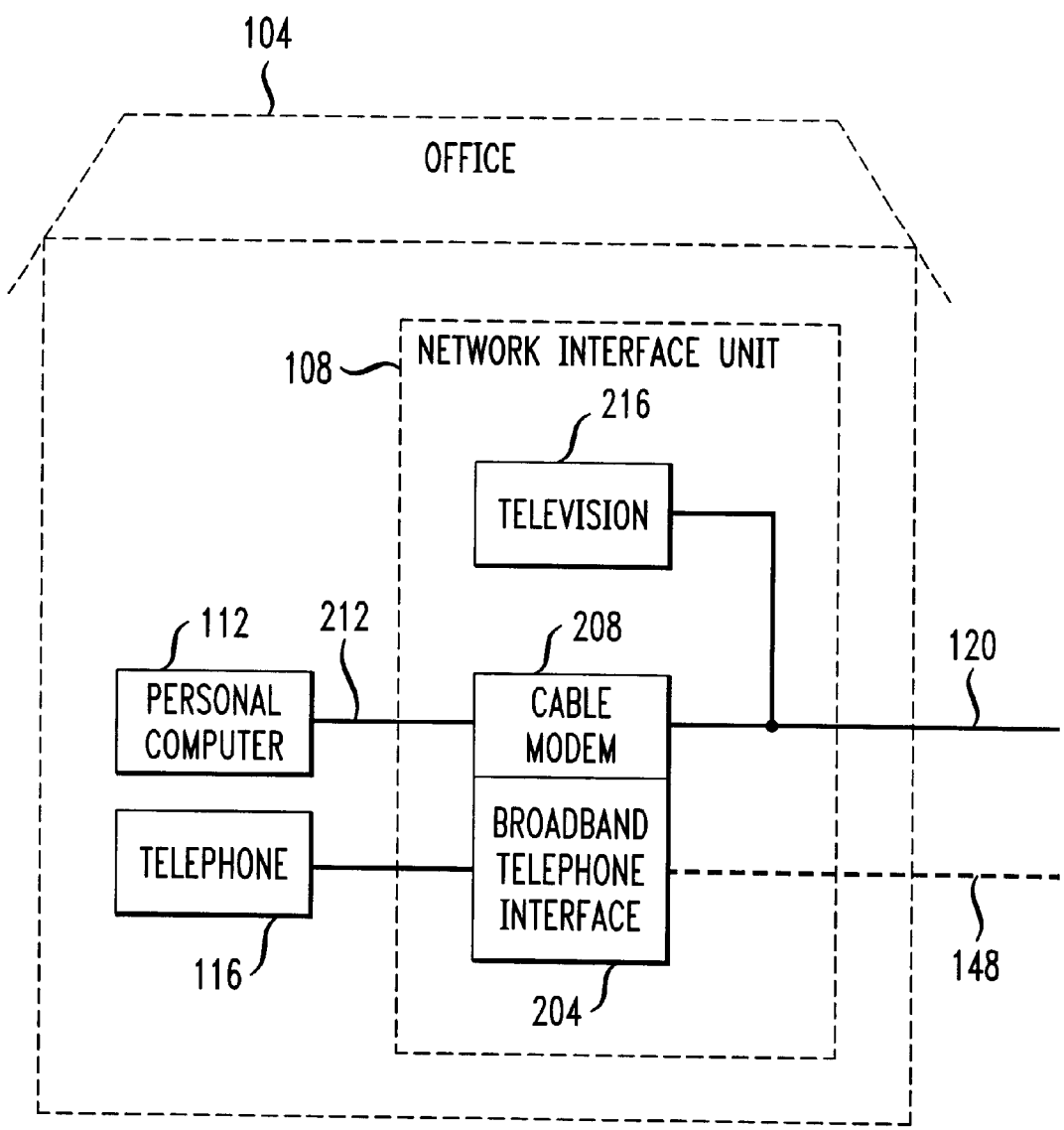
FIG. 2 illustrates an office in a system which provides telephony and high speed data access on a cable system.

FIG. 2 illustrates an office in a system which provides telephony and high speed data access on a cable system in accordance with another preferred embodiment of the present invention. The office 104 houses the NIU 108, the personal computer 112, the telephone 116, a local area network (LAN) 212 and a television 216. The NIU 108 further comprises a broadband telephone interface (BTI) 204 coupled to a cable, modem 208.

The office 104 is coupled to the LEC line 148 and the broadband access network 120, which is illustrated in this preferred embodiment as a cable network. The LEC line 148 is coupled to the BTI 204 which is coupled to the telephone 116. The telephone 116 may be one of many telephones in an internal telephone network and may also be legacy equipment such as, but not limited to, fax machines, voice grade modems, hand sets and internal housing wiring. The BTI 204 may have a plurality of standard RJ-11 jacks to support a plurality of lines of telephony service.

The cable network 120 is coupled to the cable modem 208 which is coupled to the LAN 212 which is coupled to the personal computer 112. The LAN 212 may be an ethernet, for example, and the personal computer 112 may be a plurality of personal computers coupled to the ethernet. The cable 120 is also coupled to the television 216.

In operation and use, the personal computers 112 through an ethernet 212 access high speed data ports in the cable modem 208. Through the cable modem 208, the ethernet 212 is provided, for example, internet services on the cable network 120. The television 216 accesses voice, high speed data and combinations thereof directly from the cable network 120.

In a preferred embodiment, the BTI 108 provides custom telephony services including, but not limited to, caller-identification, call waiting, tone block, return call, repeat call, call block, call forwarding, call forwarding on busy, call forwarding when no answer, anonymous call rejection, identa-ring, priority call, three-way calling and blocking. Furthermore, a wide ranging list of destinations may be dialed including, but not limited to, local calls, directory assistance, emergency calls, recorded announcements, domestic long distance calls, carrier-selected long distance calls, toll-free calls, operator services, international calls, and so-called 500/700/900 calls. The BTI 204 supports voice packetization and a dynamic fail-safe switch to the LEC backup line 148. For the telephone ports, in the upstream direction, the BTI 204 samples the signal, performs speech compression, and performs packetization. The cable modem 208 places the packets on the cable network 120. In the downstream direction, the BTI 204 receives packets from the cable network 120 through the cable modem 208, performs jitter compensation in a playout buffer, performs decompression and plays out the samples. The BTI 204 is also responsible for dual tone multi-frequency (DTMF) generation and detection, ringing voltage generation and off-hook detection.

Transmission on the cable network 120 requires power. During power outages, the LEC line 148 is used to complete inbound and outbound telephone calls. In a preferred embodiment, the transition from the cable network 120 to the LEC line 148 is performed automatically and transparently with almost imperceptible performance differences. In some embodiments, calls in progress at the time of a power loss are dropped, and the user must redial. In other embodiments, custom calling features are not available during power outages. In another embodiment, the BTI 204 provides, for example, all PSTN features and functions, except during the fail-safe mode. In the fail-safe mode of another embodiment, the LEC backup line 148 provides basic plain old telephone service (POTS).

In a preferred embodiment, the NIU 108 provides the architecture for a migration plan by accommodating future networks by providing compatibility with the ATM backbone as well as adaptability to any new features and functions that may arise.

Although the foregoing invention has been described in terms of certain embodiments, other embodiments will become apparent to those of ordinary skill in the art in view of the disclosure herein. Accordingly, the present invention is not intended to be limited by the recitation of embodiments, but is intended to be defined solely by reference to the appended claims.

What is claimed is:

1. A system for providing telephony and high speed data access over a broadband access network, comprising:

a network interface unit (NIU) coupled to a telephone line, wherein said NIU comprises a cable modem and means for accessing a telephone line during a power outage, wherein the NIU comprises a broadband telephone interface (BTI), the BTI coupled to the telephone line and capable of sampling a signal on the telephone line, performing speech compression, and performing packetization;

the broadband access network coupled to the NIU, wherein the NIU comprises a cable modem and wherein the broadband access network is a hybrid-fiber coaxial cable, the cable modem coupled to the hybrid-fiber coaxial cable;

an intermediate point-of-presence (IPOP) coupled to the broadband access network wherein the IPOP comprises an access network termination system (ANTS) coupled to a switch, the ANTS coupled to the broadband access network and wherein the IPOP further comprises at least one number translation database, the at least one number translation database coupled to the switch; and at least one external access network coupled to the IPOP.

2. A system for providing telephony and high speed data access over a broadband access network, comprising:

a network interface unit (NIU) coupled to a telephone line wherein the NIU is capable of sampling a signal on the telephone line, performing speech compression, and performing packetization;

the broadband access network coupled to the NIU, wherein the NIU comprises a cable modem and wherein the broadband access network is a hybrid-fiber coaxial cable, the cable modem coupled to the hybrid-fiber coaxial cable;

an intermediate point-of-presence (IPOP) coupled to the broadband access network, wherein the IPOP comprises an access network termination system (ANTS) coupled to a switch, the ANTS coupled to the broadband access network and wherein the IPOP further comprises at least one number translation database, the at least one number translation database coupled to the switch; and at least one external access network coupled to the IPOP.

3. A method for providing telephony and high speed data access on a broadband access network, comprising the steps of:

providing a network interface unit (NIU), wherein the NIU comprises a cable modem and wherein said broadband access network is a hybrid-fiber coaxial cable, the cable modem coupled to the hybrid-fiber coaxial cable;

providing means to said NIU to sample a signal of a telephone line, means to perform speech compression and means for packetization;

providing an intermediate point-of-presence (IPOP) for telephony and high speed data access on said broadband access network, said IPOP comprising means for separating voice and data traffic, means for switching to an external access network, the separating means coupled to the switching means and means for routing to the external access network, the routing means coupled to the switching means;

coupling a telephone line and the broadband access network to the NIU;

using the NIU to provide telephony and high speed data access on the broadband access network; and using the NIU to support the telephone line during power outages by connecting a backup telephone line to a dynamic fail-safe switch in the NIU.

4. A method for providing a network interface unit (NIU) in a system for providing telephony and high speed data access on a cable network, comprising the steps of:

providing to said NIU cable modem means and wherein a broadband access network is a hybrid-fiber coaxial cable, said cable modem means coupled to the hybrid-fiber coaxial cable;

providing means to said NIU to sample a signal of a telephone line, means to perform speech compression and means for packetization;

providing an intermediate point-of-presence (IPOP) for telephony and high speed data access on said broadband access network, said IPOP comprising an access network termination system, a switch coupled to said termination system and at least one number translation database coupled to said switch;

supporting a backup, local exchange carrier (LEC) line with a broadband telephone interface (BTI) utilizing a dynamic fail-safe switch to the backup LEC line;

using the backup LEC line during a failure of the cable network; and accessing telephony and high speed data through said cable modem means coupled to the cable network.

* * * * *